United States Patent [19]
Rhodes

[11] 4,122,827
[45] Oct. 31, 1978

[54] KINEMATIC SYNCHRONOUS SOLAR HELIOSTAT

[76] Inventor: William A. Rhodes, 4421 N. 13th Pl., Phoenix, Ariz. 85014

[21] Appl. No.: 827,750

[22] Filed: Aug. 25, 1977

[51] Int. Cl.² .................................................. F24J 3/02
[52] U.S. Cl. ....................................... 126/270; 74/3.5; 185/27; 185/37
[58] Field of Search ............... 126/270, 271; 60/641; 237/1 A; 74/3.5; 185/27, 37

[56] References Cited

U.S. PATENT DOCUMENTS

| | | | |
|---|---|---|---|
| 561,755 | 6/1896 | Barr | 126/270 |
| 1,345,758 | 7/1920 | Folsom | 126/271 |
| 1,386,781 | 8/1921 | Harvey | 126/271 |
| 3,077,949 | 2/1963 | Pahl | 185/27 |
| 3,081,638 | 3/1963 | Bowen | 74/3.5 |
| 3,648,529 | 3/1972 | Illman et al. | 74/3.5 |

*Primary Examiner*—Kenneth W. Sprague
*Attorney, Agent, or Firm*—Warren F. B. Lindsley

[57] ABSTRACT

A kinematic solar heliostat for reflecting solar energy onto a fixed target which uses a single drive to position reflected solar energy onto such target during daytime hours at any latitude and having a capability of automatically returning eastwardly each day to reflect such energy on the target the following day.

17 Claims, 10 Drawing Figures

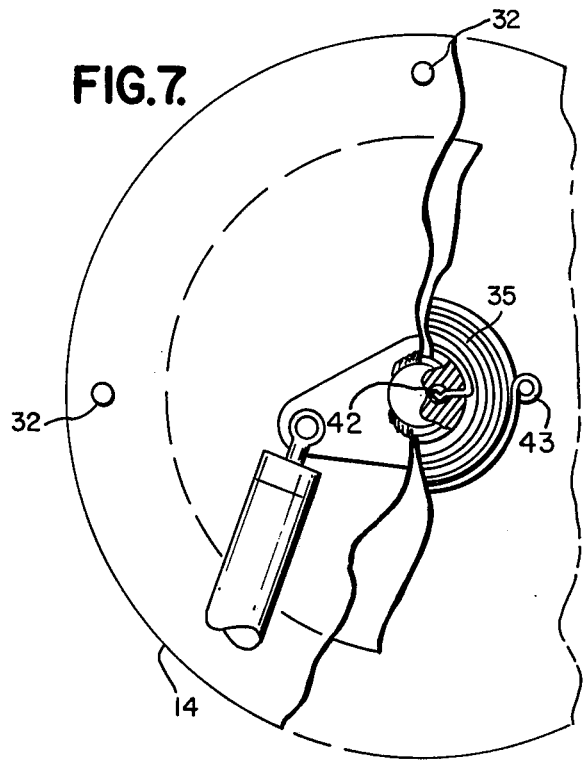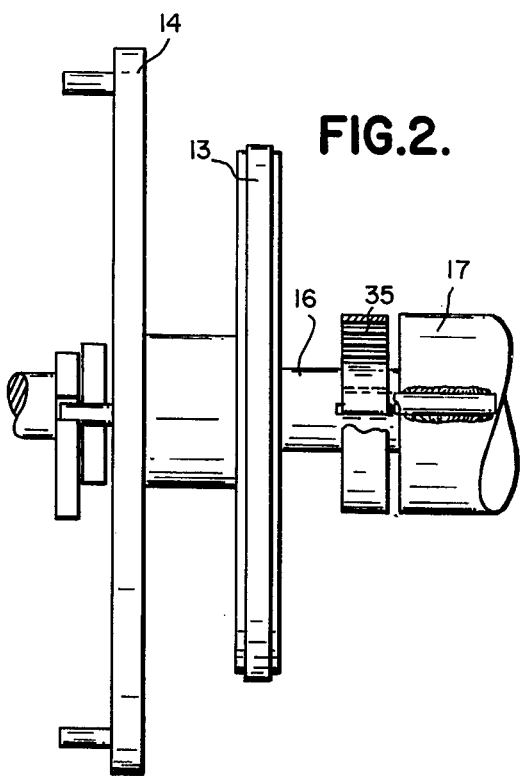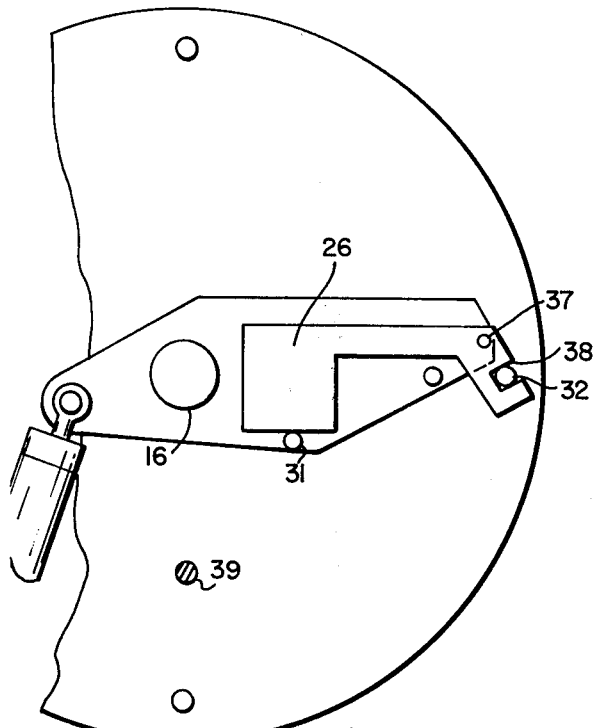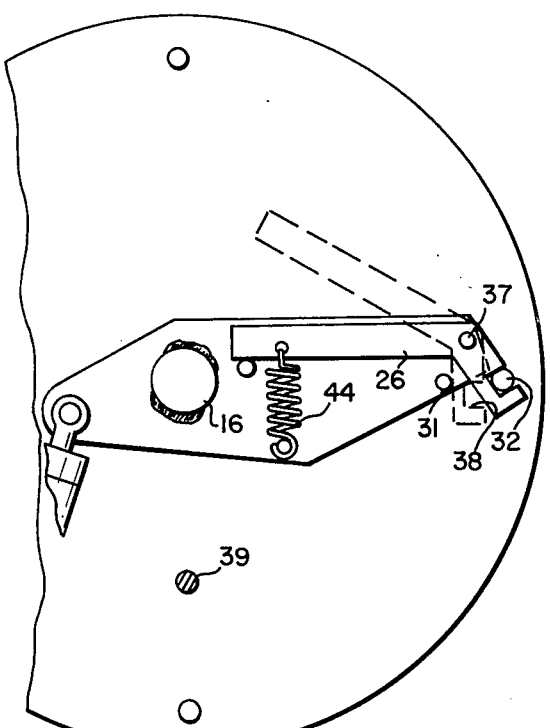

U.S. Patent  Oct. 31, 1978  Sheet 3 of 3  4,122,827
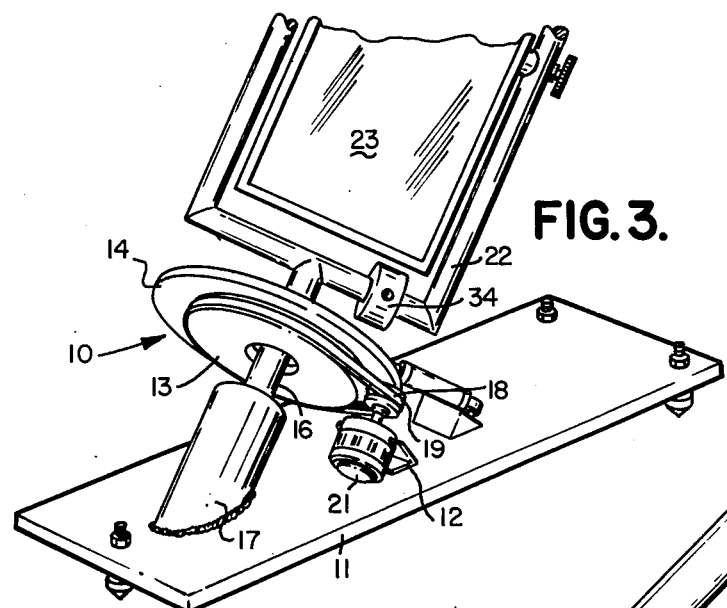
FIG. 3.
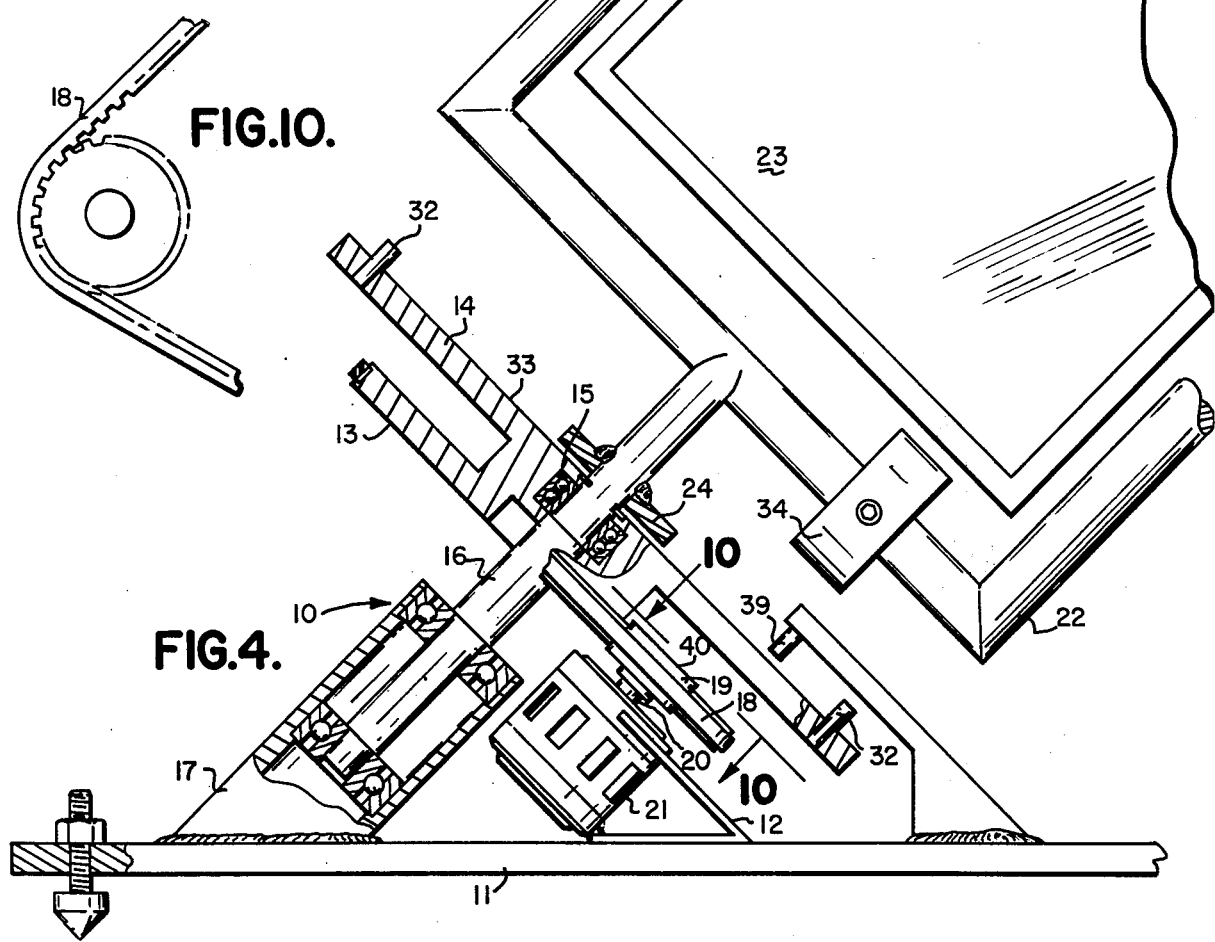
FIG. 10.
FIG. 4.

KINEMATIC SYNCHRONOUS SOLAR HELIOSTAT

BACKGROUND OF THE INVENTION

In recent years mirrors have been used to reflect solar rays upon a fixed target. It is necessary, however, to mount and drive such mirrors at one half the earth's rotational period which will then provide a stationary reflected beam. It is usual in such installations to point one axis of the mounting toward the celestial pole and another longitudinal axis of the mirror frame tiltable in declination for seasonal changes.

Since the angle of incidence of arriving light onto the reflective surface of the mirror must always be equal to the angle of reflected light leaving the mirror, the axis of the mounting must be aligned with the polar axis of the earth and must be driven at the rate of one revolution in 48 hours. It is, therefore, understood that while daylight will occupy a 12 hour period, more or less depending on seasonal solar position, actual mirror movement is therefore only ninety degrees to hold the reflected beam on target. It has been customary for this polar axis with the mirror to then be either manually reset or decoupled from the 48 hour rate and moved backward by rather elaborate and expensive devices and linkages.

Although such heliostat drives appear simple, their movements and precise relocation mechanism to pick up and track solar rays each morning has required expensive additions which disqualifies their use as a production item for use by the general public.

DESCRIPTION OF THE PRIOR ART

Heretofore, heat exchangers, particularly the type adapted to collect cold or heat have been constructed either with a series of tubes imbedded in a flat collective surface or have a curved or semi-cylindrical reflector with a round tube mounted at approximately its focal point with U.S. Pat. Nos. 1,946,184 and 3,321,012 being representative thereof. Relative to this latter form of the prior art, fins or vanes have been mounted about the tube in an effort to obtain more efficiency from the unit.

Even at best, the prior art heat exchangers have been extremely inefficient even to the point where it is necessary to incorporate thereinto an elaborate system of gears and racks or other means to shift or otherwise change the position of the exchange or collector unit so that its relative position to the source of heat will remain constant.

SUMMARY OF THE INVENTION

In accordance with the invention claimed, an improved kinematic solar heliostat is provided which requires only a single driving means to provide for 48 hour continuous rotation. This driving means is coupled to the polar axis of the reflective mirror to automatically cause that axis to retrograde and set the reflector in an easterly position to synchronize with the morning solar rays to reflect them once again onto a given receiver. The only manual requirement of the disclosed apparatus is to relocate the reflected beam periodically with seasonal sun positioned changes. Sunlight can be economically beamed into areas which due to their structure orientation prohibit direct sunlight from entering. Thus a new means is provided for use of solar illumination which is economical to use and install.

It is, therefore, one object of this invention to provide a sequential solar timing movement with total independence as to tracking and automatic retrograde resetting ability.

Another object of this invention is to provide a heliostat mirror guiding movement with only five major components.

A further object of this invention is to provide a heliostat drive system capable of automatic daily sequential operation inclusive of all tropical and temperate zone locations.

A still further object of this invention is to provide an automatic sequential synchronous movement adaptable for any equatorial type of mirror mounting desired including fork and double yoke mechanisms.

A still further object of this invention is to provide a solar heliostat sequential synchronous movement wherein the only energy required for its operation is a single source of electric power which provides the synchronous rotational period.

BRIEF DESCRIPTION OF THE DRAWINGS

The present invention may be more readily described by reference to the accompanying drawings in which:

FIG. 2 is a partial side view of FIG. 1;

FIG. 3 is a partial side perspective view of the heliostat shown in FIG. 1 illustrating the fork mounted mirror and drive system at an elevational angle;

FIG. 4 is a sectional view of FIG. 3;

FIGS. 5 and 6 show alternate escapement mechanisms for use with the structure shown in FIG. 1;

FIG. 7 shows a partial cutaway view of the structure shown in FIG. 1 with a coil spring return;

FIG. 10 shows a gear belt for a locked ratio drive.

DESCRIPTION OF THE PREFERRED EMBODIMENT

Figure 1:
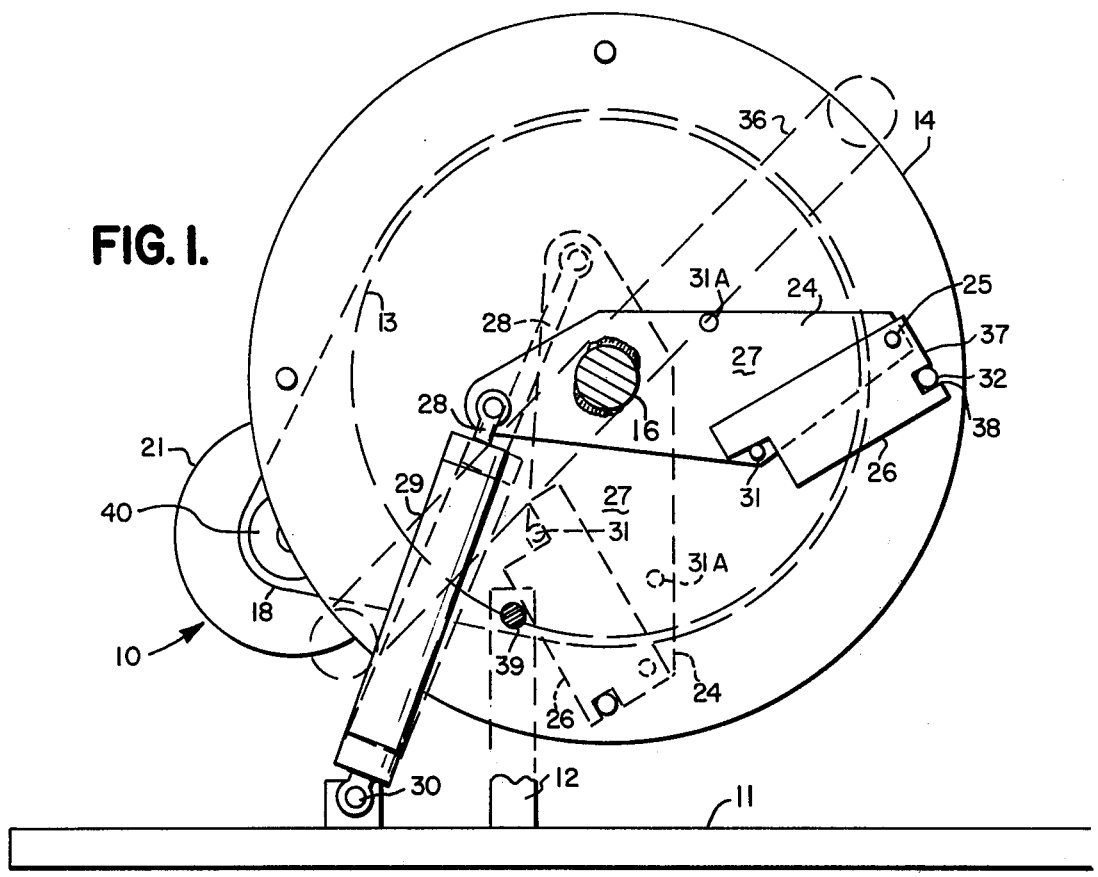
FIG. 1 is a front elevational view looking down the axis and showing details of the escapement and drive mechanism.

Referring more particularly to the drawings by characters of reference, FIG. 1 discloses a synchronous escapement driven heliostat movement 10 providing a synchronous source of rotary energy which is attached to frame base 11 by a bracket 12 shown more clearly in FIG. 4.

The heliostat movement 10 comprises a slip clutch pulley arrangement comprising a pair of pulley wheels 13 and 14 which are rotatably mounted via a bearing 15 on a shaft 16 fitted into a bearing support structure 17 forming an angular protrusion of frame base 11.

A pulley belt 18 is positioned over the periphery of either pulley wheels 13 and 14, (with the unused one omitted from the structure, if so desired) and in driving arrangement around a pulley wheel 19 mounted on the shaft 20 of a synchronous electric gear-motor 21 supported on frame base 11 by bracket 12, as shown in FIG. 4.

In FIG. 4 the free end of shaft 16 is attached to one end of a frame 22 which has movably mounted within its periphery a mirror 23. Accordingly, as shaft 16 is rotated by motor 21, frame 22 and mirror 23 are simultaneously rotated.

FIGS. 1 and 4 illustrate a lever arm 24 which is rigidly mounted on shaft 16 between pulley wheel 14 and frame 22. One end of lever arm 24 has rotatably attached to it by means of a pin 25 an escapement means 26. Escapement means 26 has a limited rotory movement juxtapositioned to the planar face 27 of lever arm 24. The other end of lever arm 24 is pivotally attached to the piston rod 28 of an air cylinder 29 which is pivotally anchored at 30 to frame 11. The air cylinder provides impact damping of the movement escapement 26 against pin 32 at notch 38 as shown in FIG. 1. As noted pin 25 holds escapement 26 for limited rotary relationship near the face 27 of lever arm 24 and pins 31 and 31A limit such rotary movement.

Figure 8:
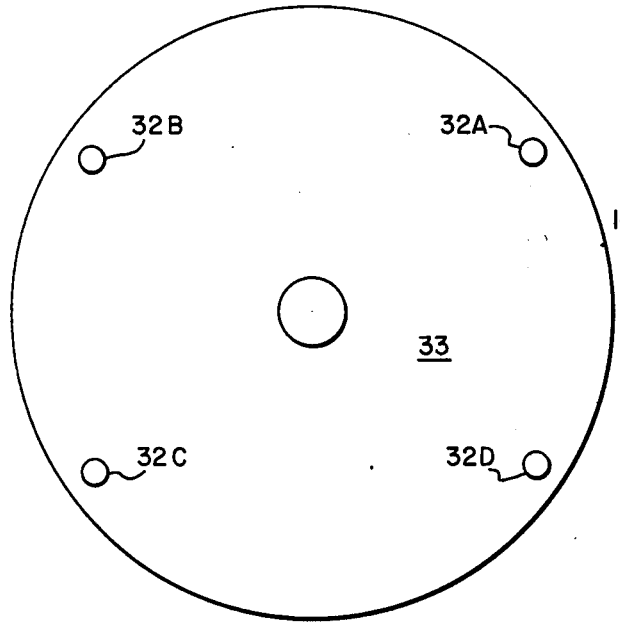
FIG. 8 shows escapement locking pallets at 110° and 70° positions, respectively.
Figure 9:
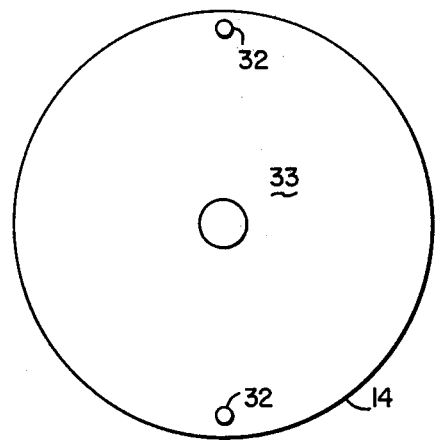
FIG. 9 shows another variation of the two locking pallets shown in FIG. 8 at 180° positions.

In order to provide means for counter-clockwise rotation of the pulley wheels 13 and 14, locking pallets may be spacedly positioned on pulley wheel 14 around its periphery. As shown in FIGS. 1, 4 and 8, four such pallets 32 may be positioned on pulley wheel 14 to extend laterally thereof from the surface 33 thereof. As will be described, only two pallets 32 may be utilized as shown in FIG. 9 under given conditions.

Since pulley wheel 14 is rotated clockwise by motor 21, an axially coupled counter torque means must be coupled to shaft 16 to rotate it counter-clockwise at the appropriate moment.

Two such counter rotate means are disclosed herein, one such device comprises a counterweight gravatational return means 34 shown in FIGS. 3 and 4 and a coil spring 35 shown in FIG. 7.

The counterweight gravitational return means 34 shown in FIGS. 3 and 4 is shown in a proper position or arrangement to escapement 26 of FIG. 1 at the beginning of a daylight period. To clarify this relationship reference character 36 indicates the plane of mirror 23 shown in FIG. 4.

The counterweight gravitational return means 34 may be located anywhere off the axial center of the frame 22 and mirror 23 as long as it reposes on the eastern portion of the meridian at all times along the plane 36 of FIG. 1. Gravitation thrust must always be sufficient to overcome the bearing frictions of the structure plus energy sufficient to actuate escapement 26 when a locking pallet 32 strikes its escapement ramp 37 shown in FIG. 1.

The escapement 26 returns to its initial position by means of gravity through the effects of weight 34 or coil spring 35 so as to always move notch 38 of escapement 26 toward the periphery of wheel 14 when freed of any contact with locking pallets 32.

With reference to FIG. 1, when wheel 14 is rotated clockwise, weight 34 is elevated to where escapement 26 contacts stationary impulse pallet 39 attached to frame base 11. Further rotation forces escapement 26 to release locking pallet 32 from notch 38.

Upon the unlocking of pallet 32 from notch 38, weight 34 rotates shaft 16 counter-clockwise carrying with it escapement 26 and mirror 23. Impact damping of escapement 26 is provided by piston rod 28 of the air cylinder 29 in the manner heretofore described. When weight 34 has moved to its lowermost position, notch 38 of escapement 26 has reached the next locking pallet 32 located counter-clockwise from the one just released. Ramp 37 of escapement 26 is contacted by the next pallet 32 causing that locking pallet to reach notch 38 of escapement 26 and to be held thereby. Gravity pulls the escapement downwardly to lock the pallet within notch 38 whereby immediate clockwise synchronous motion of wheel 14 rotates shaft 16 tracking at one half the solar rate to again provide a fixed solar reflection upon the stationary receiver target located at a distance from mirror 23.

During operating conditions, wheel 14 will make one revolution each 48 hours assuming shaft 16 is aligned with the celestial polar axis. At the beginning of each day, assuming the target is due south from mirror 23, the mirror is disposed at an angle of 45° from its plane shown in FIG. 4. If the locking pallets 32 are exactly postioned at quadrature around wheel 14, as shown in FIG. 1, the rising sun's rays when due east at the spring and fall equinox will fall by reflection from the mirror upon the target and through manual rotation of mirror 23 on its declination axis and slippage of a clutch 40 associated with pulley wheel 19 allows pulley wheel 19 on the shaft 20 of the synchronous motor 21 to slip. Once solar rays are on target, clamping nut 41 shown in FIG. 4 is tightened and the heliostat movement 10 is released with slip clutch 40 taking over and the synchronous drive motor 21 controlling its operation.

As shown in FIG. 1, the first mode or illustration of the invention is illustrated wherein the heliostat movement will synchronously recycle each day and night for a total movement of 90° each day and night. Since automatic recyling is required, tracking continuously is necessary to provide continuous synchronism of the 360° celestial sphere and one half the rate of earth's rotation. Therefore, the proper period of rotation of wheel 14 is once per 48 hour period which may be expressed as:

Time = Solar Mean Time X2

In actuality, however, the sun operates on "Apparent Time" which varies about 15 minutes faster and slower than Mean Time used for clocks. This places the sun either ahead or behind Mean Time by that amount twice a year. The maximum rate of change occurs during a 30 day spring period where the change is about 10 minutes toward the Mean Time and in September when the change is about 10 minutes toward a slower more eastwardly position. Four times a year the equation of time is zero where Apparent and Mean Time coincides, i.e., about April 15, June 14, September 1 and December 25. As the sun's position changes from Mean Time, the only operation required of the disclosed heliostat movement to correct this position of the sun's reflected beam is to manually move pulley wheel 14 onto the target and release it along with any declination connection needed. During any such relocation, escapement 26 must be locked onto any one of the locking pallets provided.

In order to permit the heliostat movement disclosed to track Apparent Time instead of Mean Time, the synchronous drive motor 21 may be replaced by a step motor fed by a digital minicomputer which would be programmed to compensate for Apparent Time and in a similar manner would take care of seasonal declination of the mirror axis.

In order to utilize the disclosed heliostat movement at latitutdes of, for example, 35° north which position provides additional solar exposure time, the locking pallets on wheel 14 may be staggered, as shown in FIG. 8. Starting with the upper right hand portion of which pallet 32A is positioned 110° from pallet 32B and pallet 32C is sequentially removed 70° from pallet 32B. Pallet 32D is separated from pallet 32C a further 110° with 70° separating pallets 32C and 32A.

If such a sequential arrangement of the pallets is needed, the counterweight arrangement disclosed in FIG. 4 might be inadequate and gravitational energized counter revolutional movement should be avoided. The alternative to this action is to utilize the coil spring 35 shown in FIGS. 2 and 7. As noted one end 42 of spring 35 is attached to shaft 16 and the other end 43 is coupled to the frame or housing of bearing 17. These are but a few of several retrograde force means which may be applied to store and release energy for retrograde motion. It can be seen that regardless of locking pallet location in relationship to the escapement 26, the escapement will be activated to release when contacted by the stationary impulse pallet 39. Under the staggered locking relationship shown in FIG. 8, it is necessary to select the correct segment of wheel 14 at the beginning of its function otherwise the heliostat movement would track only 70° during the day and then trip and reset.

With such a staggering relationship of the locking pallets the maximum sunlight on target is guaranteed for the particular latitude of operation. Of particular consideration is the fact that when operated in higher latitudes requiring a further separation of daytime locking pallet locations, the mirror image will progressively show a narrower beam until beyond 50° North Latitude where further staggering becomes impractical with this modification of the invention.

A further modification of the invention is shown in FIG. 9 where only two pallets 32 are used on pulley wheel 14 each spaced 180° apart, the use of an additional spring 44 may be used to return escapement 26 to its locking position shown in full lines of FIG. 1.

By placing escapement 26 of FIG. 5 in a beginning position as shown on pulley wheel 14, once it sizes a locking pallet 32, it will not release it until forced to do so by the stationary impulse pallet 39 and spring 44 of FIG. 6 can be omitted. This modification is practical in all latitude locations. Regardless of the length of daytime sunlight hours, tracking continues on throughout the night with the mirror 23 going into a semi-stowed downwardly facing position at night ready to be tripped into position for the next day time function.

It is believed to be unnecessary to describe for a man skilled in the art a mechanism for locking the mirror 23 upon its declination axis of rotation since many common choices are available. Likewise those trained in the art may require a mirror mounting other than the forked frame 22 shown in the drawings. It is therefore left to those so trained to apply the heliostat movement claimed to the reflector and mounting used.

With the choice of an appropriate east to west rotational rate, other celestial objects also may be tracked onto a fixed target such as a telescope. In this event the mirror would be optically flat with a reflector surface on the front side thereof.

Thus, repeated tracking of celestial objects each night would be automatically provided for such telescopes. When such celestial tracking is employed the heliostat becomes a "coelostat".

It would be apparent to those skilled in the art that various substitutions and modifications may be made therein without departing from the spirit of the invention or from the scope of the appended claims.

What is claimed is:

1. An escapement movement comprising:
a frame,
a shaft rotatably mounted on said frame,
a wheel rotatably supported on said shaft,
an escapement means coupled to said shaft juxtapositioned to said wheel,
a frame mounted stationary unlocking pallet,
at least a pair of spacedly positioned pallets mounted on said wheel,
a first means for rotating said wheel in a first direction,
a second means for rotating said escapement means in a second direction opposite to said first direction,
one of said wheel mounted pallets and said escapement means engaging each other during at least a part of the movement of said wheel in said first direction,
said movement of said first wheel when in engagement with said escapement means causing a storage of potential energy in said second means until said unlocking pallet engages said escapement means causing a decoupling of said escapement means from said wheel,
whereby the kinetic energy stored in said second means causes counter rotation of said shaft and said wheel until the other of said wheel mounted pallets engages said escapement means.

2. The escapement movement set forth in claim 1 wherein:
said pair of wheel mounted pallets extend laterally from the plane of said wheel juxtapositioned to said escapement means.

3. The escapement movement set forth in claim 1 wherein:
said wheel mounted pallets comprises a plurality of pins spacedly positioned around the periphery of the plane of said wheel juxtapositioned to said escapement means.

4. The escapement movement set forth in claim 3 wherein:
said pins are spacedly positioned around the periphery of said wheel in equal increments.

5. The escapement movement set forth in claim 1 wherein:
said first means comprises an electric motor.

6. The escapement movement set forth in claim 5 wherein:
said electric motor comprises a synchronous motor.

7. The escapement movement set forth in claim 1 wherein:
said one of said pallets intercepts and holds said escapement means when said wheel is moved in said first direction.

8. The escapement movement set forth in claim 1 in further combination with:
a mirror attached to said shaft for rotatable movement therewith for receiving and directing a beam of light on to a receiver.

9. A heliostat movement comprising:
an oscillating shaft,
a synchronously driven wheel rotatably mounted on said shaft for completing one revolution each 48 hours in a first direction,
said wheel being provided with a plurality of rotational limiting means extending laterally therefrom,
escapement means coupled to said shaft and disposed to intercept sequentially each of said rotational limiting means,
a stationary means mounted on said movement,
said escapement means being released from each of said rotational limiting means upon engagement with said stationary means, means for causing a second direction of rotation of said shaft upon release each time of said escapement means from said rotational limiting means, said second direction of rotation of said shaft being provided by a force means reacting against said shaft when moved in said first direction to repeat according to the sequential arrangement of said rotational limiting means the rotational rate of said wheel in said first direction.

10. The heliostat movement set forth in claim 9 wherein:

said rotational limiting means and said stationary means are pallets.

11. The escapement movement set forth in claim 10 in further combination with:

a solar radiant energy reflecting mirror attached to said shaft to reflect solar energy upon a stationary solar radiation receiver.

12. The escapement movement set forth in claim 10 wherein:

said force means comprises a storage means for the energy of the movement of said wheel in said first direction.

13. The heliostat movement set forth in claim 10 in further combination with:

a frame for rotatably supporting said shaft, said escapement means being provided with a notch into which said pallets forming said rotational limiting means are moved when intercepted by said escapement means.

14. The heliostat movement set forth in claim 9 in further combination with:

a slip clutch attached to said shaft, and means for damping the rotation of said shaft in said second direction.

15. The heliostat movement set forth in claim 9 wherein:

said means for causing a second direction of rotation of said shaft comprises a continuous rotational force bias means.

16. A solar heliostat comprising:

a frame;

a declination axially mounted mirror means;

a celestial polar shaft means attaching to said mirror means;

a driven wheel rotatably axially and concentrically attached to said polar shaft means;

a driving means coupled to said driven wheel to provide a 48 hour rotational period;

an escapement holding arm coupled to said polar shaft means;

said polar shaft means containing torque biasing force means to cause counter rotation of said axis upon its release;

an escapement means attached to said escapement holding arm;

a plurality of locking pallets each attached to said driven wheel in a manner to intercept said escapement means;

a stationary impulse pallet located to intercept said escapement means whereof said escapement means is moved to release one of said locking pallets causing said escapement means, escapement arm, polar shaft means and mounted mirror to move eastward due to biasing force means reacting to rotate said polar shaft means until said escapement means engages the next sequential locking pallet whereupon celestial tracking rate resumes uninterrupted;

each retrograde relocation providing continuous daytime placement of solar reflection upon a fixed receiver position, without the use of manual resetting for same each day.

17. The solar heliostat set forth in claim 16 wherein:

said mirror means comprises a second axis supported by said polar shaft means at right angles thereto, means for mounting a reflective surface thereto and substantially parallel to said second shaft.

* * * * *